United States Patent
Hartkop et al.

(10) Patent No.: US 11,420,766 B2
(45) Date of Patent: Aug. 23, 2022

(54) MULTI SENSOR SUPPORT STRUCTURE

(71) Applicants: David Thomas Hartkop, Medford, OR (US); Jon Fetzer, Denver, CO (US)

(72) Inventors: David Thomas Hartkop, Medford, OR (US); Jon Fetzer, Denver, CO (US)

(73) Assignee: Espheric, LLC, Denver, CO (US)

(*) Notice: Subject to any disclaimer, the term of this patent is extended or adjusted under 35 U.S.C. 154(b) by 870 days.

(21) Appl. No.: 15/597,232

(22) Filed: May 17, 2017

(65) Prior Publication Data
US 2017/0334579 A1 Nov. 23, 2017

Related U.S. Application Data

(60) Provisional application No. 62/337,335, filed on May 17, 2016.

(51) Int. Cl.
*B64C 27/00* (2006.01)
*B64D 47/08* (2006.01)
*B64C 39/02* (2006.01)

(52) U.S. Cl.
CPC ............ *B64D 47/08* (2013.01); *B64C 39/024* (2013.01); *B64C 2201/027* (2013.01); *B64C 2201/108* (2013.01); *B64C 2201/127* (2013.01)

(58) Field of Classification Search
CPC ........ B64C 2201/162; B64C 2201/123; B64C 27/001; B64C 27/08; B64C 27/006; B64D 47/08
See application file for complete search history.

(56) References Cited

U.S. PATENT DOCUMENTS

| | | | | |
|---|---|---|---|---|
| 2,457,425 | A * | 12/1948 | Wolfard | B64C 27/001 248/584 |
| 2011/0184647 | A1* | 7/2011 | Yoel | G08G 5/0021 701/301 |
| 2015/0204672 | A1* | 7/2015 | Belanger | G01S 11/12 701/523 |
| 2015/0274294 | A1* | 10/2015 | Dahlstrom | B64D 1/18 239/722 |
| 2016/0137293 | A1* | 5/2016 | Santangelo | B64C 39/024 244/50 |
| 2016/0157414 | A1* | 6/2016 | Ackerman | A01B 69/008 701/25 |
| 2016/0327950 | A1* | 11/2016 | Bachrach | G05D 1/0016 |
| 2017/0313441 | A1* | 11/2017 | Tsai | B64C 39/024 |
| 2017/0341776 | A1* | 11/2017 | McClure | B64D 47/08 |
| 2018/0002035 | A1* | 1/2018 | Neely | B64D 47/08 |

* cited by examiner

*Primary Examiner* — Claude J Brown

(57) ABSTRACT

A spheroidal framework having sensors is mounted to a multi-rotor aircraft with elastic members and adjustable aircraft mounts whereby transmission of vibration from the aircraft to the framework is dampened and whereby the framework's position relative to the aircraft's center of gravity may be changed by selectively tensioning the elastic members and by adjusting the position of the aircraft mounts.

18 Claims, 3 Drawing Sheets

Top

Perspective

Front

Side

MULTI SENSOR SUPPORT STRUCTURE

TECHNICAL FIELD OF THE INVENTION

The present invention relates to camera and/or sensor support structures that may be attached to multi-rotor aircraft that may be operated either remotely or autonomously. Further, the sensor support structure relates to arrays of multiple sensors that provide a complete or spherical point of view by virtue of the multiple sensors having overlapping fields of view. The present invention also relates to support schemes by which a sensor-supporting structure may be attached to the airframe of a multi-rotor aircraft in such a manner that it is vibrationally dampened by a multi-directional tension shock mount arrangement with no portion of the aircraft in view of the sensors and with either a neutral or a restorative effect on locating the support structure's center of mass at or near the center of mass or geometric structure of the aircraft.

SUMMARY OF INVENTION

The invention is a sensor support structure built as an open framework that can be assembled around the body of a multi rotor aircraft such that the sensors overlapping fields of view together collectively provide a completely spherical field of view with no portion of the aircraft within the spherical field of view. The framework consists of straight or curved struts which connect some number of hubs or unions. Each hub is provided with a means for the secure attachment of a camera or other sensor. The cameras are mounted such that they face outward, away from the center point of the framework. Some number of hubs are also provided with a means for the secure attachment of tensioned elastic members. These attachment points face inward toward the middle of the framework. The tensioned elastic members provide tension force between the framework and attachment members placed upon the structure of a multi rotor aircraft. These attachment members are built such that they allow for some adjustment in the X, Y and Z directions, facilitating the placement and adjustment of the invention's center of mass with respect to the aircraft, The multi rotor aircraft may be contained by the frame in such a way that its rotors emerge or are located wholly outside the body of the support structure, while the power supply, electronics, and much of the mechanical structure of the aircraft are contained within. In operation, the multi rotor aircraft is able to fly while the structure of the aircraft, including its rotors, are entirely outside of the field of view of any of the sensors. The given invention thus provides an unobstructed and vibrationally dampened spherical point of view. Such a point of view, when captured with video cameras, can be post-processed and displayed in one of several virtual reality (VR) formats and viewed on a conventional display or with a head-mounted display (HMD). The use of cameras or laser range finding sensors (LIDAR or Structured Light) may also be used for the capture and subsequent reconstruction of three-dimensional information about an environment.

DETAILED DESCRIPTION OF A PREFERRED EMBODIMENT OF THE INVENTION

Figure 1A:
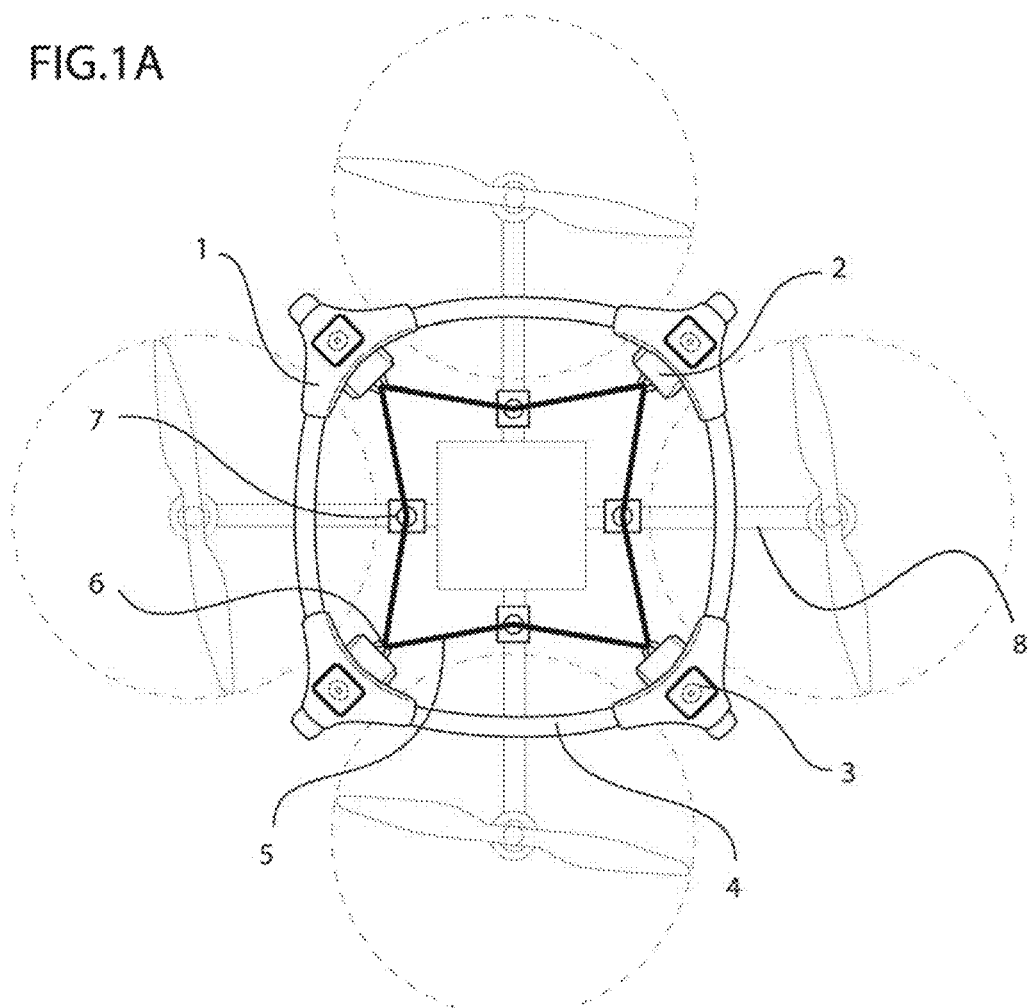
FIG. 1A is a top view of a preferred embodiment of the invention shown attached to a quadcopter multi rotor aircraft.
Figure 1B:
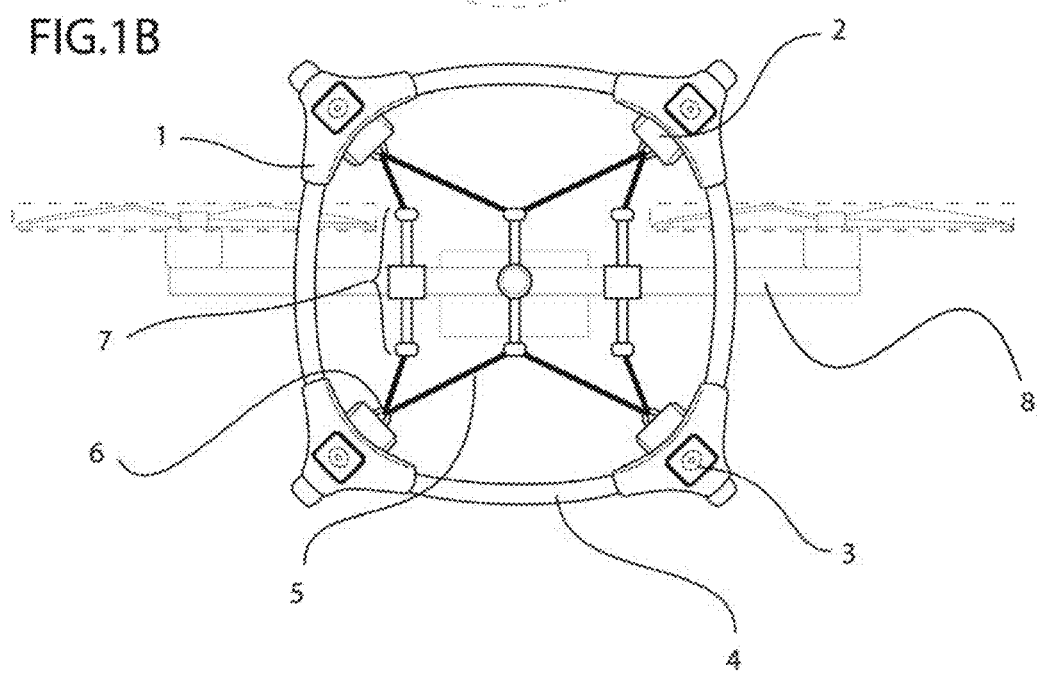
FIG. 1B is a side view of a preferred embodiment of the invention shown attached to a quadcopter multi rotor aircraft.
Figure 2:
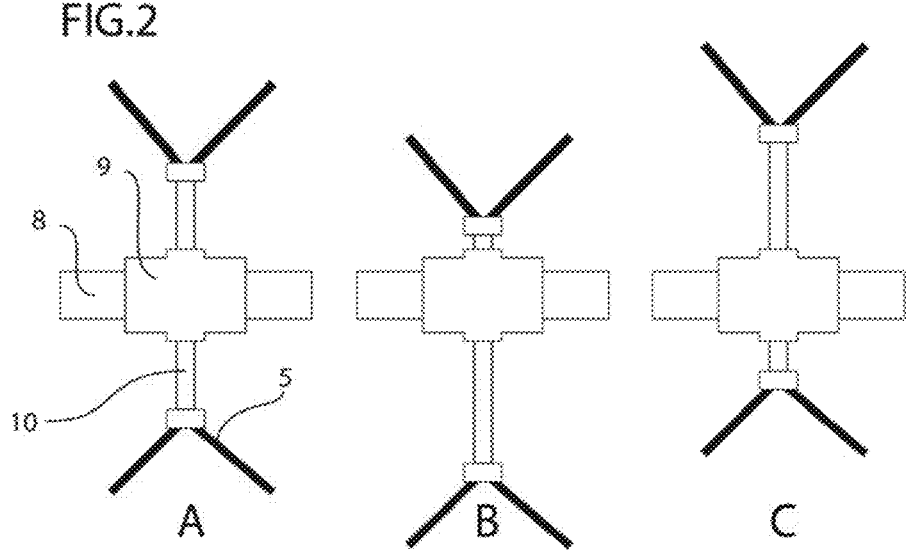
FIG. 2 shows three different exemplary configurations of connection bars which are attached to the aircraft's framework.

A preferred embodiment of the given invention consists of lightweight camera support structure created as an open framework around a quadcopter multi rotor aircraft. As shown in FIG. 1, the framework consists of a series of eight hubs 1 containing fixed camera mounts 2 for self contained high-definition wide-angle video camera recorders 3. Each of the eight hubs is connected to three others by curved tubular struts 4. Both the hubs and the struts may be composed of carbon fiber composite or some comparable lightweight high-strength structural material. The framework is coupled to the four 'arms' of the quadcopter 8 by means of tensioned metal or polymer springs 5. The springs are stretched in a shock mount arrangement between inner connection points 6 on the framework and a set of four connection bars 7 that have been retrofitted to the aircraft. The connection bars 7, shown in FIG. 2, are held perpendicular to the aircraft's arms and can be adjusted in the Z-axis to provide adjustability of the framework's center of mass with respect to the aircraft. The connection bars 7 are each held to the aircraft frame 8 by means of a collared clamp 9. The attachment bars 10 provide for attachment points of tensioned elastic members 5 at both ends, and are able to be pre-set to a position within the collared clamp 9, as illustrated by the positional differences shown between FIGS. 2 A, B, and C. The position of each attachment bar 10 can be mechanically fixed by means of a set screw or bolt within the clamp body 9. A slight X, Y adjustability is also provided by locating the collared clamp 9 on the aircraft's arms at slightly different positions.

Figure 3:
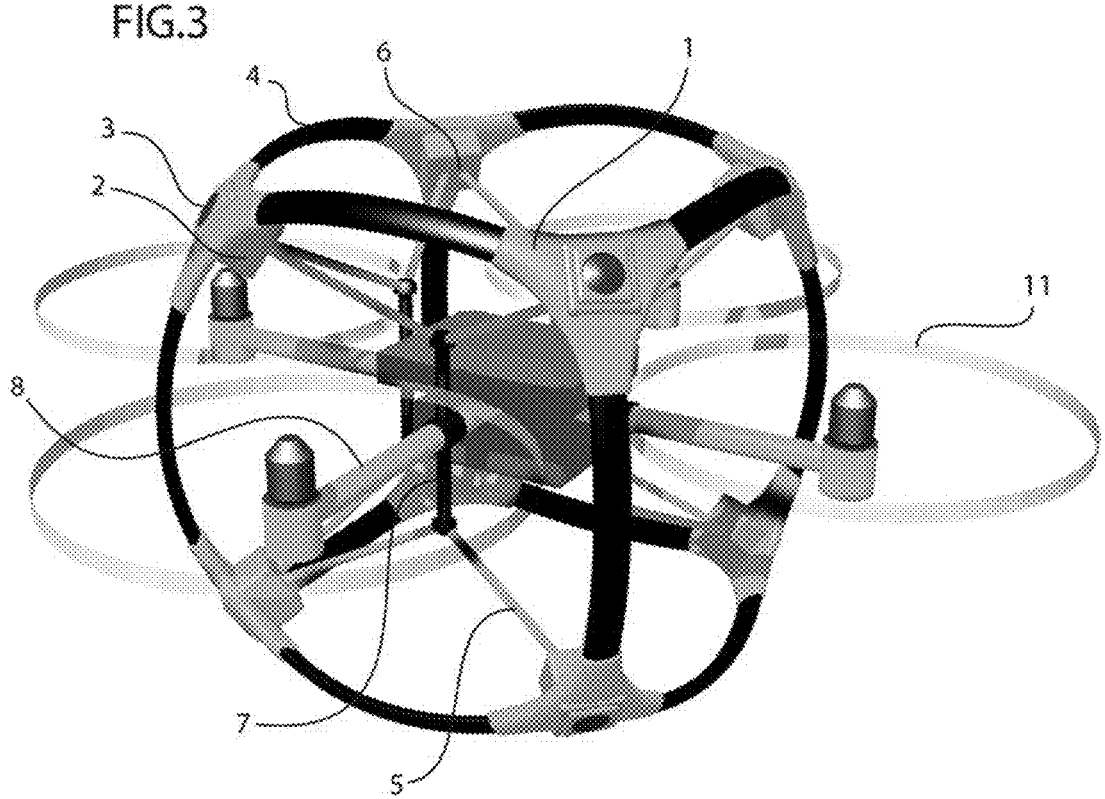
FIG. 3 shows a perspective rendering of a preferred embodiment of the invention attached to a quadcopter multi rotor aircraft.
Figure 4:
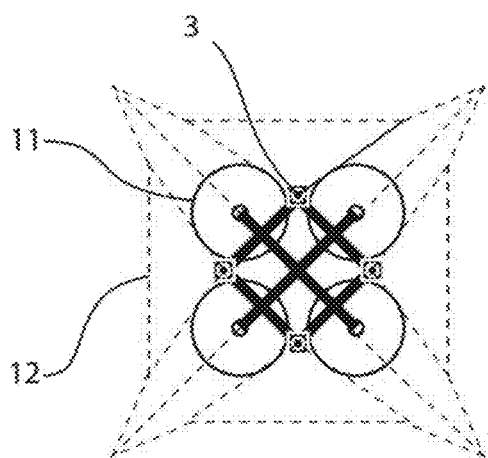
FIG. 4 shows four visual projections of a preferred embodiment the present invention in conjunction with a multi-rotor aircraft and a dotted line showing the boundary of the cameras combined field of view.
Figure 4:
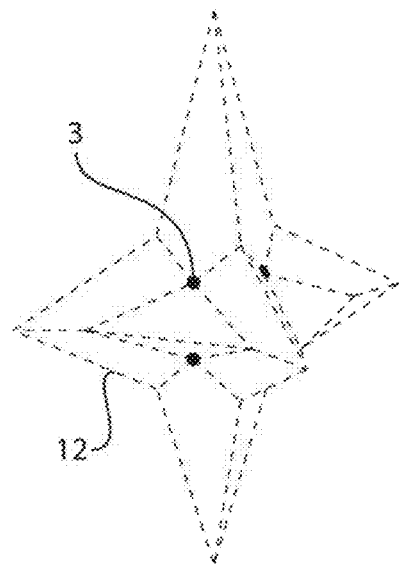
Figure 4:
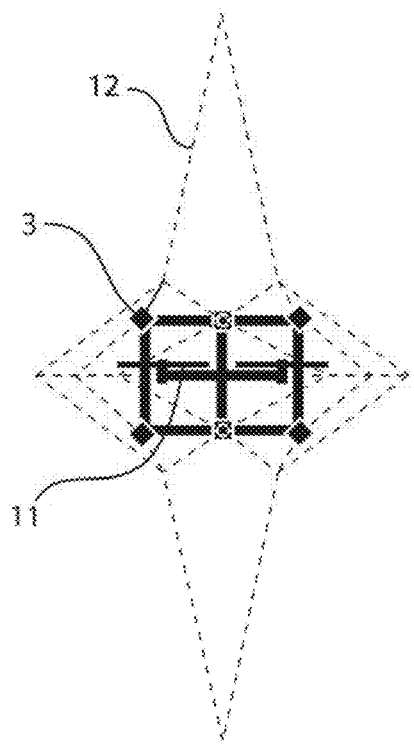
Figure 4:
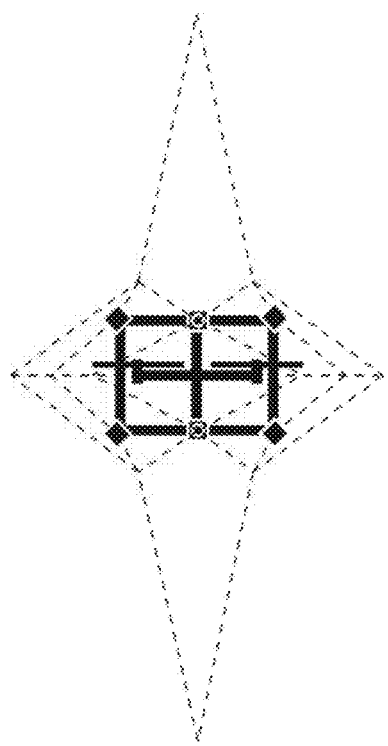

Optimally the frameworks' center of mass will be made to coincide with the center of mass of the aircraft in its unloaded state. FIG. 3 is a perspective rendered illustration of the present invention in conjunction with a quadcopter aircraft. The purpose of this illustration is to clarify the relationship of the camera holding framework with respect to the airframe of the aircraft. The tension members of the shock mount are shown as being the only structural connection between the camera framework and the aircraft. FIG. 4 shows four visual projections of the preferred embodiment in conjunction with a multi-rotor aircraft and a dotted line showing the boundary of the cameras combined field of view. In this projection, each of the eight cameras 3 are shown as pointing outward away from the center of the framework. Contained in the framework is a multi-rotor aircraft 11 which is entirely within the visually excluded region 12 that has as its boundaries the edges of the combined fields of view from the cameras 3. The boundaries of the cameras combine to form an 'invisible region' 12 in space of sufficient size as to allow for the presence of a lift-providing multi-rotor aircraft, which cannot be seen by any of the cameras attached to the framework. The invisible region 12 is sufficient in size and shape as to include within it the outermost edges of the aircraft rotors and, therefore, the collective filed of views of cameras 3 provide a complete unobscured spherical field of view. The present invention thus enables unobstructed spherical visual capture for the purposes of live VR capture, aircraft operational safety, VR content capture for entertainment and news gathering, 3D scanning of environments and structures, immersive remote exploration, archaeological studies, and disaster relief support.

The invention claimed is:

1. An aircraft enveloping structure comprising:
a rigid framework comprising a plurality of frame members interconnecting a plurality of sensor support regions arranged about said framework;
one or more aircraft mounts, each aircraft mount adapted to mount onto a portion of the multi-rotor aircraft;
a plurality of tensionable elastic members, each elastic member adapted to connect the framework to at least one aircraft mount connected to the aircraft whereby connecting said plurality of tensionable elastic members to said framework and to at least one aircraft mount creates a shock mount mechanically coupling said framework to the aircraft such that transmission of vibration from the aircraft to said framework is dampened; and
whereby adjusting the position of the rigid framework relative to said aircraft's center of mass may be effectuated by making adjustments from the group comprising selectively adjusting the position of said one or more aircraft mounts on the aircraft and selectively adjusting the tension of said elastic members.

2. The aircraft enveloping structure of claim 1, comprising a plurality of aircraft mounts and a plurality of selectively tensionable elastic members for connecting the structure to said one or more mounts aircraft.

3. The aircraft enveloping structure of claim 1 wherein said rigid plurality of frame members are curved and interconnected into a spheroidal framework.

4. The aircraft enveloping structure of claim 3, wherein the aircraft comprises a multi-rotor aircraft having a plurality of arms, said plurality of sensors comprise cameras arranged on said sensor support regions of said spheroidal framework and said aircraft mounts are configured to connect said spheroidal framework to one or more of the plurality of the arms of the aircraft.

5. The aircraft enveloping structure of claim 4, wherein the aircraft is a quadcopter having four arms and each said aircraft mount connects to one of the quadcopter's arms.

6. The aircraft enveloping structure of claim 1, wherein said sensors are mounted to said sensor support regions.

7. A method of data capture comprising, in no particular order:
providing an aircraft;
providing a rigid framework for the aircraft, said rigid framework comprising a plurality of frame members interconnecting a plurality of sensor support regions arranged about said framework;
providing at least one sensor;
providing one or more aircraft mounts, each aircraft mount adapted to mount onto a portion of the aircraft;
providing a plurality of tensionable elastic members, each elastic member adapted to connect the framework to at least one aircraft mount;
connecting said one or more aircraft mounts to the aircraft such that their position may be adjusted;
connecting each elastic member to said framework and said at least one aircraft mount to create a shock mount mechanically coupling said framework to the aircraft such that transmission of vibration from the aircraft to said framework is dampened;
adjusting the position of the rigid framework relative to said aircraft's center of mass by making adjustments selected from the group comprising adjusting the position of said one or more aircraft mounts on the aircraft and adjusting the tension of said elastic members;
supporting said at least one sensor on one of said plurality of sensor support regions; and
flying the aircraft while operating said at least one of said plurality the sensors.

8. The method of claim 7 wherein said data capture comprises one or more types of data selected from the group comprising photographs, video, 3D and non-visual data.

9. The method of claim 7 wherein said data capture comprises multiple simultaneous capture methods, each capture method having a full unobstructed spherical point of view.

10. The method of claim 9, wherein the capture methods are selected from the group comprising camera and radar-based capture methods.

11. The method of claim 10 wherein said camera and radar-based capture methods are selected from the group comprising infrared, visible, and LIDAR based methods.

12. A multi-rotor aircraft enveloping support structure kit comprising:
a plurality of sensor support hubs, each support hub respectively adapted to support a sensor;
a plurality of frame members, each frame member adapted to interconnect at least two sensor support hubs;
one or more aircraft mounts, each aircraft mount adapted to mount onto a portion of the multi-rotor aircraft;
a plurality of tensionable elastic members, each elastic member adapted to connect the framework to at least one aircraft mount;
whereby connecting each frame member to at least one sensor support hub creates a framework with said hubs arranged about said framework such that a plurality of sensors supported on said sensor support hubs are oriented such that no component of the multi-rotor aircraft is in the field of view of any of the sensors and adjacent sensors have overlapping point of views whereby the overlapping points of view together collectively provide a spherical point of view;
whereby connecting said plurality of tensionable elastic members to said framework creates a shock mount mechanically coupling said framework to the aircraft such that transmission of vibration from the aircraft to said framework is dampened; and
whereby adjusting the position of the aircraft enveloping structure relative to said aircraft's center of mass may be effectuated by making adjustments from the group comprising selectively adjusting the position of said one or more aircraft mounts on the aircraft and selectively adjusting the tension of said elastic members.

13. A multi-rotor aircraft enveloping support structure kit, as claimed in claim 12, wherein, when assembled, said sensor support framework defines an internal volume of sufficient size to contain the aircraft's body and to provide an invisible zone that is outside of the field of view of any sensor and of sufficient size to contain each and every component of the aircraft.

14. A multi-rotor aircraft enveloping support structure kit, as claimed in claim 12, wherein said one or more aircraft mounts comprise a collar adapted to clamp onto an arm of the aircraft and has a rigid member extending from said collar.

15. A multi-rotor aircraft enveloping support structure kit, as claimed in claim 14, wherein said rigid member is slidably supported by said collar.

16. A multi-rotor aircraft enveloping support structure kit, as claimed in claim 12, wherein said tensionable elastic members are connected to a sensor support hub on one end and to said rigid member on the other end.

17. A multi-rotor aircraft enveloping support structure kit, as claimed in claim 12, wherein each said sensor support hub defines a recess within which a sensor may be housed and defines three openings to each respectively receive a frame member.

18. A multi-rotor aircraft enveloping support structure kit, as claimed in claim 12, wherein said frame members are curvilinear and the framework is spheroidal.

\* \* \* \* \*

UNITED STATES PATENT AND TRADEMARK OFFICE
CERTIFICATE OF CORRECTION

PATENT NO. : 11,420,766 B2
APPLICATION NO. : 15/597232
DATED : August 23, 2022
INVENTOR(S) : David Thomas Hartkop and Jon Fetzer It is certified that error appears in the above-identified patent and that said Letters Patent is hereby corrected as shown below:

In the Claims

Claim 2, at Column 3, Line 34, change "to said one or more mounts aircraft" to --to said aircraft--

Signed and Sealed this
Fourth Day of October, 2022

Katherine Kelly Vidal
*Director of the United States Patent and Trademark Office*